United States Patent [19]
Lim et al.

[11] Patent Number: 5,880,171
[45] Date of Patent: Mar. 9, 1999

[54] FAST CURING POLYMERIC COMPOSITIONS FOR OPHTHALMIC LENSES AND APPARATUS FOR PREPARING LENSES

[75] Inventors: Fredric J. Lim, Freemont; Young C. Bae, Pleasonton; David S. Soane, Piedmont, all of Calif.

[73] Assignee: 2C Optics, Inc., Alpharetta, Ga.

[21] Appl. No.: 371,447

[22] Filed: Jan. 11, 1995

Related U.S. Application Data

[63] Continuation of Ser. No. 2,082, Jan. 11, 1993, abandoned, which is a continuation-in-part of Ser. No. 869,326, Apr. 15, 1992, abandoned, which is a continuation-in-part of Ser. No. 820,271, Jan. 14, 1992, and Ser. No. 608,123, Nov. 1, 1990, Pat. No. 5,114,632, which is a continuation-in-part of Ser. No. 345,718, May 1, 1989, Pat. No. 5,110,514.

[51] Int. Cl.$^6$ .......................... C08F 26/02; C08F 299/02; G05B 1/04
[52] U.S. Cl. ...................... 523/106; 523/523; 351/160 R; 525/44; 525/445; 525/455; 525/531; 525/539; 525/112; 526/323.2
[58] Field of Search ..................... 523/106, 523; 351/160 R; 525/44, 445, 531, 539, 112; 526/323.2

[56] References Cited

U.S. PATENT DOCUMENTS

| | | | |
|---|---|---|---|
| Re. 29,131 | 2/1977 | Smith et al. | 525/445 |
| Re. 30,212 | 2/1980 | Carder | 526/301 |
| 3,891,523 | 6/1975 | Hisamatsu et al. | 526/301 |
| 4,073,967 | 2/1978 | Sandvig | 427/299 |
| 4,146,696 | 3/1979 | Bond et al. | 526/194 |
| 4,268,134 | 5/1981 | Gulati et al. | 351/163 |
| 4,376,800 | 3/1983 | Lu et al. | 526/301 |
| 4,382,135 | 5/1983 | Sinka et al. | 526/301 |
| 4,435,450 | 3/1984 | Coleman | 427/385.5 |
| 4,544,572 | 10/1985 | Sandvig et al. | 427/162 |
| 4,800,123 | 1/1989 | Boekeler | 428/424.2 |
| 4,853,279 | 8/1989 | Shibata et al. | 525/531 |
| 4,873,029 | 10/1989 | Blum | 264/1.3 |
| 4,912,185 | 3/1990 | Toh | 526/301 |
| 5,070,166 | 12/1991 | Su et al. | 526/301 |
| 5,147,585 | 9/1992 | Blum et al. | 264/134 |
| 5,149,181 | 9/1992 | Bedford | 351/166 |
| 5,196,296 | 3/1993 | Watanabe et al. | 525/531 |

FOREIGN PATENT DOCUMENTS

| | | | |
|---|---|---|---|
| 2607955 | 9/1977 | Germany | 525/445 |
| 0102601 | 6/1982 | Japan | 523/106 |
| 61 64716 | 5/1986 | Japan . | |
| 3223308 | 10/1991 | Japan | 523/106 |
| PCT WO 90/05061 | 5/1990 | WIPO . | |

OTHER PUBLICATIONS

Toh, H.K., "Ophthalmic Plastics: Some Recent Advances," *Chemical Abstracts*, No. 107:860r, Chem. Aust., vol. 54(1–2), pp. 36–37, (1987).

Plastics Industry News, vol. 30, No. 7, p. 99 (1984).

*Primary Examiner*—Andrew E. C. Merriam
*Attorney, Agent, or Firm*—Needle & Rosenberg, P.C.

[57] ABSTRACT

A polymerizable composition for the production of high quality ophthalmic lenses is disclosed that includes:

a) between 20 and 90 weight percent, and preferably, at least 50 weight percent, of urethane, epoxy, or polyester oligomers end terminated with acrylate or methacrylate (or mixtures of acrylate and methacrylate);

b) between 5 and 50 to 80 percent, preferably between 10 and 40 percent, by weight of an optional diluent, such as a hydrocarbon diol end terminated with acrylate or methacrylate, or mixtures thereof, or a crosslinkable tri-, tetra-, or poly-acrylate or methacrylate, or mixtures thereof; and c) conventional optional additives, including but not limited to free radical initiators, UV absorbers, mold release agents, stabilizers, dyes, antioxidants, and wetting agents.

The invention also includes ophthalmic lenses prepared from this composition and an apparatus for the production of lenses using sequential polymerization.

18 Claims, 2 Drawing Sheets

FAST CURING POLYMERIC COMPOSITIONS FOR OPHTHALMIC LENSES AND APPARATUS FOR PREPARING LENSES

This is a continuation of U.S. application Ser. No. 08/002,082 filed on Jan. 11, 1993, now abandoned, that is a continuation-in-part of U.S. Ser. No. 07/869,326, entitled "Polymer—Polymer Composite Lenses with High Scratch Resistance and High Impact Resistance," filed on Apr. 15, 1992, now abandoned, that is a continuation-in-part of: 1) U.S. Ser. No. 07/820,271, entitled "High Impact Resistant Macromolecular Networks" filed by David S. Soane on Jan. 14, 1992, now U.S. Pat. No. 5,278,243; and 2) U.S. Ser. No. 07/608,123, entitled "Controlled Casting of a Shrinkable Material," filed on Nov. 1, 1990, by David S. Soane, now U.S. Pat. No. 5,114,632, that is a continuation-in-part of U.S. Ser. No. 07/345,718, filed on May 1, 1989, by David S. Soane, now U.S. Pat. No. 5,110,514, both patents incorporated by reference herein.

This invention is in the area of polymeric compositions that are suitable for casting into ophthalmic lenses, lenses prepared from these compositions, and apparatus for the production of lenses.

BACKGROUND OF THE INVENTION

Most of the plastic ophthalmic lenses sold today by optical dispensers such as retail eyewear outlets are made by machining the desired prescription into the back face of a semi-finished lens blank made from diethylene glycol bis (allyl carbonate) resin, also known as CR-39. These blanks are manufactured off-site by casting the starting monomer for CR-39 between a set of glass molds held together by a flexible gasket and restraints. The mold assembly is initially heated in an oven using a precise cure schedule. During the subsequent polymerization step, the liquid resin is converted into a glassy solid. Shrinkage of up to 16 percent of the material occurs during polymerization and crosslinking. The molds must be designed to account for the shrinkage, so that the lens blank has the desired front curvature. The complexity of design is increased if, instead of a semi-finished lens blank, a finished lens is desired in which both the front and back surfaces have defined curvatures. Another disadvantage in preparing CR-39 lenses is that they require cure schedules of as long as sixteen hours.

Casting lenses from polymerizable compositions on-site would be preferable to a retail eyewear outlet over machining lens blanks if problems associated with shrinkage of the polymerizable material during casting and the long cure time of could be solved. One advantage of casting on-site is that the equipment needed for casting is less expensive than the lens generators and polishing instruments used in lens machining. Second, the casting process is cleaner and generates less waste than the machining process. In addition, the cost of the finished lens to the eyewear outlet using a casting process may be less than that when the lens is prepared by machining a lens blank, particularly for aspheric, multifocal, and progressive lenses.

CR-39 is unsuitable as a material for casting into lenses in one hour processing laboratories because of its slow reaction rate. It would be of great benefit to have a material that maintains most of the desirable properties of CR-39, such as good abrasion resistance, chemical resistance, impact resistance, clarity and generally superior optical properties, yet polymerizes in a short amount of time. It would also be of benefit to have an apparatus that can be used to produce lenses on-site in a short amount of time.

U.S. Pat. No. 4,912,185 to Toh discloses a crosslinkable casting composition for ophthalmic lenses that includes (A) a polyoxyalkylene glycol dimethacrylate or diacrylate, (B) at least one polyfunctional cross-linking agent, and (C) up to 40% by weight of a urethane monomer having from two to six terminal acrylic or methacrylic groups. The polymerizable composition disclosed in the '185 patent was designed to be used in conjunction with traditional methods for the preparation of ophthalmic lenses, wherein the polymerizable solution is poured into numerous molds, cast with blanket radiation, heated and then removed. The method of casting requires the use of a low viscosity polymerizable solution to minimize the problems that result from air entrapment. The '185 patent states that the viscosity of the polymerizable solution should not exceed approximately 200 cps at 25° C. The polyoxyalkylene glycol diacrylate or dimethacrylate, present in the polymerizable composition in a range of 40 to 60% by weight, functions as a viscosity reducing agent for the composition. The polyoxyalkene moieties are based on ethylene oxide or propylene oxide repeating units, with 6 to 11 alkylene oxide repeating units preferred, as shown below.

Methacrylate terminated polyoxyalkylene glycols are preferred over acrylate terminated polyoxyalkylene glycols in the '185 patent because they have lower reactivities than the acrylate counterparts, which, using the traditional casting process, reduces surface aberration and internal stress. The patent indicates that this composition can be fully cured by two to four passes under a UV lamp followed by one hour of heat treatment at 100 degrees C.

An advance in the art of polymerizing shrinkable materials, including polymerizable solutions for ophthalmic lenses, was disclosed in U.S. Ser. No. 07/608,123, entitled "Controlled Casting of a Shrinkable Material," filed on Nov. 1, 1990, that is a continuation-in-part of U.S. Ser. No. 07/345,718, filed on May 1, 1989 by David S. Soane. Briefly, polymerizable material is introduced between two mold halves, one of which is, or both are, constructed of a material that transmits energy, either thermal or UV. Stress related voids in the polymeric material are eliminated by causing the partially polymerized material to polymerize in a differential fashion along a moving front, so that the material ahead of the moving polymer zone remains liquid, and the material that the front has passed is solidified. In a typical method, the moving front is a slit through which UV or thermal energy is transmitted. The still-liquid material ahead of the moving polymer zone can then flow freely, at a rate that equals the rate of shrinkage, and a void-free, reduced stress polymeric network is produced. Using this process, lenses can be cast in a way to prevent cavitation, or voids caused by the shrinkage of material during polymerization. This method is referred to below as "sequential polymerization."

Japanese Patent No. 61064716 (Chem. Abstract 105:192198b) discloses an impact resistant optical resin prepared by polymerizing acrylate or methacrylate, adducts of monoepoxide and brominated bis-phenol, polyisocyanate and other unsaturated compounds such as styrene or divinylbenzene.

Urethanes have been used in coatings for ophthalmic lenses. U.S. Pat. No. 4,800,123 to Boekeler discloses a scratch resistant coating prepared from a polymerizable composition that includes at least one polyfunctional monomer having three or more acryloloxy groups per molecule, and at least one N-vinyl imido group containing monomer. U.S. Pat. No. 4,435,450 to Coleman discloses a method for applying abrasion resistant thin polyurethane coatings that includes forming a hydroxy-terminated prepolymer which is subsequently crosslinked using a relatively non-volatile triisocyanate, and applying the material by flow coating onto a glass or lens.

Accordingly, it is the object of the present invention to provide a polymerizable composition that can be polymerized into a lens that maintains or exceeds the mechanical and optical properties associated with CR-39, yet has a faster cure rate than CR-39.

It is another object of this invention to provide a polymeric material that can be sequentially polymerized into a finished product in less than one hour, preferably less than thirty minutes.

It is another object of the present invention to provide a polymerizable composition for the production of high quality ophthalmic lenses that is suitable for use in combination with the apparatus and method for sequential polymerization disclosed in U.S. Pat. Nos. 5,110,514 and 5,114,632.

It is still another object of the present invention to provide an apparatus for the production of lenses using the sequential polymerization method.

SUMMARY OF THE INVENTION

A polymerizable composition for the production of high quality ophthalmic lenses is disclosed that includes:

a) between 20 and 90 weight percent, and preferably, at least 50 weight percent, of urethane, epoxy, or polyester oligomers end terminated with acrylate or methacrylate (or mixtures of acrylate and methacrylate);

b) between 5 and 50 to 80 percent, preferably between 10 and 40 percent, by weight of an optional diluent, such as a hydrocarbon diol end terminated with acrylate or methacrylate, or mixtures thereof, or a crosslinkable tri-, tetra-, or poly-acrylate or methacrylate, or mixtures thereof; and c) conventional optional additives, including but not limited to free radical initiators, UV absorbers, mold release agents, stabilizers, dyes, antioxidants, and wetting agents.

This polymerizable composition can be cast using UV radiation to produce an optically transparent object with low haze that has impact and abrasion resistance approximately equal to or better than CR-39. In one embodiment, the polymerizable composition has a viscosity of greater than 200 CPS.

In a preferred embodiment, this polymerizable composition is cast using the sequential polymerization method, as described in more detail below, in a time ranging from 10 minutes to 30 minutes depending on the polymerizable composition, initiator concentration, and UV intensity employed. Relatively high viscosity polymerizable solutions can be cast using the sequential polymerization method since the fluid can be introduced into the mold cavity without entrapping air using a procedure such as that illustrated in FIG. 2. The ability to use high viscosity polymerizable solutions allows flexibility in choosing the kind and concentration of monomer and oligomer. Higher oligomer content can be used to impart superior impact resistance to the lens. Diluents that have high functionality, (and thus viscosity) can be used to impart superior abrasion resistance.

In particular, urethane, epoxy, or polyester acrylate or methacrylate oligomers (or mixtures thereof) are selected that impart desired abrasion and impact resistance to the lens and reduce the amount of shrinkage that occurs during polymerization, because the ratio of non-reacting to reacting components is high. These oligomers have a relatively high viscosity, typically between one and one hundred megapoise at room temperature when undiluted. Therefore, these oligomers were not appropriate for use in the traditional manufacture of lenses using blanket radiation, in more than minor amounts. For example, U.S. Pat. No. 4,912,185 to Toh indicates that tetraacrylic urethane monomers can be present in the polymerizable composition for a lens using classical technology at up to 40 percent by weight of the composition. In the polymerizable composition disclosed herein, the urethane and/or epoxy acrylate or methacrylate oligomers is preferably at least 50% by weight of the polymerizable composition.

A diluent such as a hydrocarbon diol diacrylate or dimethacrylate is included as necessary for viscosity reduction, so that the solution can be cast between molds. The diluent can also impart desired mechanical properties to the final product, such as hydrophobicity and abrasion resistance. Since the diluent participates in the polymerization reaction, no solvent is evaporated. The diluent has a significantly lower molecular weight (typically less than 600) than the oligomers (400–9000 weight average molecular weight), and therefore shrinks more on a per-volume basis during polymerization. Typical concentrations of the diluent in the polymerizable composition are less than 50% by weight, preferably, between 10 to 40% by weight.

The polymerizable compositions can also be used in the preparation of materials other than ophthalmic lenses, such as plastic and glass laminates and specialty optics or lenses.

This invention also includes an apparatus that can be used for the preparation of ophthalmic lenses in retail eyewear outlets, using the sequential polymerization method.

DETAILED DESCRIPTION OF THE INVENTION

As used herein, the term "alkyl acrylate" refers to $H_2C=CHCO_2R$, wherein R is a straight, branched, or cyclic alkyl group, preferably $C_1$ to $C_{20}$, and specifically includes methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl, and other longer chain homologues.

As used herein, unless otherwise indicated, the term alkyl refers to a straight, branched, or cyclic alkyl group, preferably $C_1$ to $C_{20}$, and specifically includes methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl and other long chain homologues.

As used herein, the terms diacrylate and dimethacrylate include mixtures of acrylate and methacrylate.

As used herein, the term (meth)acrylate refers to either acrylate, methacrylate, or a mixture of acrylate and methacrylate.

As used herein, the term "alkyl methacrylate" refers to $H_2C=C(CH_3)CO_2R$, wherein R is a straight, branched, or cyclic alkyl group, preferably $C_1$ to $C_{20}$, and specifically includes methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl, and other long chain homologues.

As used herein, the term "aryl" or "aromatic" refers to phenyl, phenyl substituted with alkyl, halogen, naphthalene or naphthalene substituted with alkyl or halogen, or higher aromatics, either unsubstituted, or substituted with alkyl or halogen.

The term aralkyl refers to an aryl group with an alkyl substituent.

The term alkaryl refers to an alkyl group that has an aryl substituent.

The term alkenyl, as referred to herein, and unless otherwise specified, refers to a straight, branched, or cyclic (in the case of $C_{5-6}$) hydrocarbon of $C_2$ to $C_{20}$ with at least one double bond.

As used herein, the term oligomer refers to a compound with repeating units, of weight average molecular weight ranging from 400 to 9000, and preferably, between 800 and 2500.

As used herein, a diluent is a compound that is used to reduce the viscosity of a material, and typically has a viscosity of less than 600 CPS, and preferably, less than 150 cps at room temperature.

As used herein, the term aliphatic refers to an alkyl, alkenyl, or alkynyl group of $C_1$ to $C_{20}$.

A polymerizable composition is disclosed for use in the preparation of ophthalmic lenses that can be cured into a high quality, impact and abrasion resistant material in thirty minutes or less using the sequential polymerization method. The polymerizable composition disclosed herein can also be polymerized using conventional methods and apparatus for polymerization known to those skilled in the art. The composition includes at least 50% by weight of urethane, epoxy, or polyester oligomers (or mixtures thereof) end terminated with acrylate or methacrylate (or mixtures of acrylate and methacrylate), and an optional diluent, such as hydrocarbon diol end terminated with acrylates or dimethacrylates, or a low molecular weight crosslinkable tri-, tetra-, or poly-acrylate or methacrylate.

I. Oligomers

Proper selection of the oligomer is important to obtaining the desired physical properties of the resulting lens as the oligomer is the predominant component by weight in the polymerizable composition. Polymers prepared from acrylate and methacrylate terminated oligomers are known for their outstanding optical and mechanical properties. Because they can be tailored to obtain desired mechanical properties by blending various materials, they are candidates for numerous applications including coatings, adhesives, medical plastics, lenses, fiber optics and glazing materials.

It has been discovered that three types of oligomers are preferred for the preparation of ophthalmic lenses using the sequential polymerization method: urethanes end terminated with acrylate or methacrylate (or mixtures thereof), and epoxies or polyesters that are end terminated with acrylate or methacrylate (or mixtures thereof). In general, urethane oligomers impart toughness and abrasion resistance to the final lens, while epoxy and polyester oligomers impart hardness and chemical resistance.

In a preferred embodiment, the oligomers used in the manufacture of lenses have molecular weights ranging from 400 to 9000, but preferably between 800 and 2500. High molecular weight oligomers can produce a lens with too much flexibility, while low molecular weight oligomers can produce a lens that is too rigid with low impact resistance. The functionality (acrylate or methacrylate) of the oligomers can range from two to six. The oligomers should comprise between 20% and 90% by weight of the final formulation, preferably greater than 50% of the composition, and more typically, between 50% and 75% by weight in the composition.

a) Urethane Acrylates

Polyurethanes are a general class of polymers that contain at least two —NHCOO— linkages in the backbone of the polymer, optionally along with other functional groups in the backbone such as esters, ethers, urea and amides. Polymers prepared from urethane oligomers exhibit good abrasion resistance, toughness, flexibility for impact resistance, clarity, and stain resistance. These properties, which have made urethanes useful in the coatings industry, are also important attributes of ophthalmic products.

There are a wide variety of ways known to those skilled in the art to prepare urethane polymers. Urethane prepolymers are typically reaction products of aliphatic or aromatic polyols, polyesters, or polyethers of diverse composition with a stoichiometric excess of diisocyanate. Typically, the number of terminal hydroxyl groups of the polyol, polyester, or polyether is two or greater. The terminal hydroxyl groups react with the diisocyanate to produce urethane linkages, and the resulting prepolymer becomes end capped with isocyanate groups. Depending on the stoichiometric ratio of NCO/OH groups, the urethane linkage can also be incorporated into the backbone of the isocyanate terminated oligomer. Different urethanes can be obtained by changing (1) the diisocyanate, (2) the polyol, polyester, or polyether, or (3) the NCO/OH stoichiometric ratio. For a description of urethane oligomers and polymers, see Frisch, K. C., Applied Polymer Science (eds. J. K. Craver & R. W. Tess), Chapter 54, p. 828, ACS, ORPL, Washington, 1975.

Examples of suitable diisocyanates include 4,4'-diphenylmethane diisocyanate (MDI, available from ICI Polyurethanes Group, West Deptford, N.J.; PBA 2259 (a more stable water dispersible version of MDI also available from ICI Polyurethanes Group); 3-isocyanatomethyl-3,5,5-trimethylcyclohexyl isocyanate (IPDI, or isophorone diisocyanate, available from Huls America, Inc.); 2,4- and 2,6-toluene diisocyanate (TDI); ethylene diisocyanate, trimethylene diisocyanate, tetramethylene diisocyanate, hexamethylene diisocyanate, octamethylene diisocyanate, decamethylene diisocyanate, cyclohexyl diisocyanate, methylenebis-(4-cyclohexylisocyanate), phenylene diisocyanate, diphenylether-4,4'-diisocyanate, 2,2,4-trimethylhexamethylene diisocyanate, xylene diisocyanate, tetramethyl xylene diisocyanate, polyether diisocyanate, polyester diisocyanate, polyamide diisocyanate, dianisidine diisocyanate, 4,4'-diphenylmethane diisocyanate, tolidine diisocyanate, and dimer acid diisocyanate (a diisocyanate prepared from the reaction product of two unsaturated carboxylic acids).

Urethane prepolymers are made radiation curable by adding acrylate or methacrylate groups to the prepolymer. This is typically accomplished by reacting the isocyanate terminated oligomer with hydroxy substituted acrylates or methacrylates. Examples include but are not limited to 2-hydroxyethyl (meth)acrylate, 2-hydroxypropyl (meth) acrylate, dodecyloxyhydroxypropyl (meth)acrylate, and glycerin (meth)acrylate. Higher (meth)acrylate functionality can be obtained by reacting the isocyanate terminated oligomer with compounds such as pentaerythritol tri(meth) acrylate, which contains approximately one equivalent of hydroxyl and three (meth)acrylate groups per mole of compound. Alternatively, acrylate or methacrylate esters that include other functional groups that can react with an isocyanate can also be used, such as epoxy containing compounds such as glycidyl acrylate or methacrylate, or amino containing esters such as aminoalkyl or aminoaryl acrylate or methacrylate.

A nonlimiting example of a difunctional or trifunctional urethane prepolymer is shown below:

wherein P is an aliphatic or aromatic polyether, polyester or polyol, R is the residue of the diisocyanate to which the isocyanate moieties are attached, n=2 or 3 and A is the aliphatic (typically alkyl) or aromatic ester portion of the hydroxylated acrylate or methacrylate used to end-cap the oligomer. Urethane (meth)acrylates containing between two and six acrylate or methacrylate functional groups are readily available in industry.

The properties of the acrylate or methacrylate terminated oligomers depend on the backbone structure. Alkyl esters and ethers yellow less and are more stable to light than aromatic esters and ethers. However, aromatic esters and ethers impart hardness to the composition, and possess a higher refractive index than their alkyl counterparts, which is desirable to reduce lens thickness for a given prescription. Also, polyester based urethane acrylates or methacrylates are generally harder than polyether based systems because polyesters provide a more polar bond structure and a more basic oxygen with which stronger dipolar and hydrogen bonding interactions can occur with the urethane segments.

Hydroxy terminated polyester starting materials are often prepared from dicarboxylic acids or anhydrides, including but not limited to adipic acid, phthalic anhydride, and dimerized linoleic acid, with monomeric glycols and triols. Examples of glycols include ethylene glycol, propylene glycol, 1,2-butylene glycol, 1,4-butylene glycol, 1,6-hexylene glycol, trimethylolpropane, glycerol, and 1,2,6-hexanetriol.

Widely used polyether diols and polyols used to produce urethane oligomers include poly(oxypropylene)glycol, poly (1,4-oxybutylene)glycol, random copolymers of alkylene oxides and copolymers of tetrahydrofuran and alkylene oxides. Depending on the diisocyanate monomer, polyol group and stoichiometric ratio, urethane oligomers with widely different mechanical and chemical properties result.

Branched oligmers based on branched polyols, polyesters, or polyethers are also useful in the polymerizable composition.

Since the urethane methacrylate or acrylate has a functionality greater than one, the resulting material after polymerization is a thermoset rather than a thermoplastic material. The material cannot be reprocessed once it is cast, but has the advantage of significant chemical resistance and thermo-mechanical stability. An important factor that affects the mechanical properties of thermosets is the crosslink density of the network. Increasing the density, which is achieved by either decreasing the molecular weight between acrylate groups or increasing the functionality of the oligomer, in general leads to a higher Tg and a more abrasion resistant system. However, loss of flexibility, which causes poor impact resistance and greater shrinkage during casting, is also a result of high crosslink density.

Examples of suitable commercial acrylate or methacrylate terminated urethanes that can be used in the polymerizable composition disclosed herein include but are not limited to urethane acrylates 2264, 284, 4881, 4866, 8301 and 8804 from UCB Radcure, urethane acrylates CN955, CN960, CN961, CN963 and CN970 from Sartomer Company, and urethane acrylate NR2075 from Imperial Chemical Ind.

b) Epoxy and Polyester Acrylates

Epoxy and polyester acrylates and methacrylates are also useful oligomers for inclusion in a fast curing polymerizable solution for ophthalmic lenses because polymers prepared from these materials exhibit desired properties such as hardness, chemical resistance, and high refractive index. Polymers prepared from these monomers can be less flexible, and thus less impact resistant, than the urethane systems. Aromatic epoxy and polyester acrylates and methacrylates have poorer light stability than alkyl urethane acrylates or methacrylates. In a preferred embodiment, epoxy and polyester acrylates do not replace, but are instead used in any suitable combination with urethane acrylate or methacrylate oligomers. In one embodiment, epoxy and or polyester acrylates or methacrylates comprise from 0% up to 50% by weight of the total oligomer content.

Epoxy acrylates are typically obtained by reacting epoxide functionalities with acrylic acid, methacrylic acid, or a mixture thereof, to form an esterified acrylate or methacrylate resin. The reaction is shown below for a difunctional epoxy terminated resin:

wherein P represents an aliphatic or aromatic chain that optionally includes heteroatoms such as oxygen, nitrogen, and sulfur and functional groups in the backbone such as amide, ester epoxy, ether, and amino; R is H (in the case of acrylate) and $CH_3$ (in the case of methacrylate). The acrylate or methacrylate group then undergoes normal free radical polymerization. Typical epoxies used include aliphatic or aromatic glycidyl ethers, epoxy phenol novolac, epoxy cresol novolac, polyamine or polyamide modified epoxies, cycloaliphatic epoxy resins, and others. A portion of the epoxy moieties can remain unesterified. The final epoxy acrylate or methacrylate oligomeric composition can include (meth)acrylates, epoxies, esters, and acids.

Epoxy acrylates are disclosed in Kirk-Othmer, Encyclopedia of Chemical Technology, 2nd 3d. Vol. 8, pages 294–312 by John Wily & Sons, Inc., New York (1965), incorporated herein by reference.

Polyester acrylates are prepared by esterification of polyesters having an excess of hydroxyl groups using acrylic or methacrylic acid. Preparation of the hydroxy terminated polyesters are usually obtained by reacting acids such as adipic acid, phthalic anhydride, isophthalic acid, azelaic acid, or dimerized linoleic acid, with monomeric glycols, triols and ∈-caprolactone. Alkyl glycols and triols can be based on, as a nonlimiting example, ethylene, propylene, 1,2-butylene, 1,4-butylene, and 1,6 hexylene glycol. Triols used, for example, include trimethylolpropane, glycerol, and 1,2,6 hexanetriol. More highly branched systems can also be used to provide greater crosslinking density. Polyester acrylates can impart both elastic and rigid properties to the final product. As an example, polyesters that include aromatic acids such as phthalic anhydride or isophthalic acid impart rigidity and temperature resistance to the final product. Also, highly branched systems impart rigidity, increased chemical and heat resistance, hardness and low elongation.

II. Diluent

Low viscosity reactive diluents are included in the polymerizable composition to improve the processability of the final resin. Since the diluents are incorporated into the lens, they should be selected appropriately to impart the desired characteristics such as hydrophobicity, abrasion resistance and impact resistance. The diluents can be monofunctional, difunctional, or multi-functional, wherein the term "functional" is used to refer to groups that are reactive on curing with radiation, such as acrylate and methacrylate.

In general, acrylates are preferred over methacrylates for use in both the oligomeric component and the diluent component of the polymerizable composition, because acrylates cure more quickly than methacrylates, reducing processing time.

The diluent should be chemically compatible with the urethane acrylate or methacrylate, or epoxy acrylate or methacrylate used in the polymerizable composition. The diluent is considered compatible if phase separation does not occur on polymerization of the composition.

In one embodiment, the polymerizable composition includes a diluent of the structure:

hydrocarbon diol series wherein R is independently H or methyl, and X is a straight or branched alkane of $C_2$ to $C_{14}$. Hydrocarbon diol and branched hydrocarbon diol based diacrylates and dimethacrylates are preferred over polyoxyalkylene glycol diacrylates or dimethacrylates. The hydrocarbon diol acrylate series of diluents, which includes but is not limited to ethylene glycol diacrylate and dimethacrylate, 1,4-butane diol diacrylate and dimethacrylate, 1,6-hexane diol diacrylate and dimethacrylate, decamethylene diol diacrylate and dimethacrylate, and neopentyl glycol diacrylate and dimethacrylate, are more hydrophobic than the polyoxyalkylene glycol based systems. They are also superior in withstanding chemical attack from polar solvents such as alcohols, which are frequently used as cleaning solutions. In addition, butanediol and hexanediol diacrylate and dimethacrylate in particular impart good hardness and abrasion resistance without sacrificing impact resistance. They also exhibit good light stability and are low in viscosity. Typical concentrations of the diacrylate or dimethacrylate diluent are between 0 and 50% by weight, and preferably between 2% and 20% by weight.

In another embodiment, multi-functional acrylates and methacrylates are included in the composition to provide a strong thermoset network. These higher functional systems impart good abrasion resistance to the final lens product. Examples include tri-, tetra-, penta- and hexa-acrylated and methacrylated aliphatic or aromatic monomers that can be ethoxylated, and include, but are not limited to, ethoxylated trimethylolpropane tri(meth)acrylate, propoxylated trimethylolpropane tri(meth)acrylate, ethoxylated pentaerythritol tetra(meth)acrylate, pentaerythritol tri(meth)acrylate, glyceryl propoxy tri(meth)acrylate, dipentaerythritol penta(meth)acrylate, dipentaerythritol hexa(meth)acrylate, trimethylolpropane tri(meth)acrylate, pentaerythritol tetra(meth)acrylate, di-trimethylolpropane. The ethoxylated and propoxylated monomers, that can include any desired amount, but typically from three to nine moles of ethoxylation, provide increased flexibility, reduced shrinkage, and lower toxicity at the expense of reduced Tg and higher viscosity.

In another embodiment the diluent includes both multi-functional acrylates and methacrylates and hydrocarbon based diacrylates and dimethacrylates. In one embodiment, the diluent is a mixture of 1,6-hexane diol diacrylate and ethoxylated pentaerythritol tri- or tetra-acrylate. In a further embodiment, the diluent is a mixture of 1,6-hexane diol diacrylate and ethoxylated trimethylolpropane triacrylate.

III. Initiator

Any UV or thermal free radical initiator or mixture of initiators known to those skilled in the art of free radical polymerization can be used to initiate polymerization. Mixtures of the photoinitiators are sometimes preferred since they can in certain cases provide a more efficient production of radicals. The initiator should be non-yellowing, have a broad absorption spectrum if it is a UV initiator, and good curing efficiency. It should also be nontoxic and have low odor. Concentrations of the initiator in the polymerizable composition typically range from 0.1 to 5% by weight, although any amount can be used that provides the desired product. A relatively low concentration of initiator, between 0.1 to 0.8% by weight, is preferred to reduce yellowing.

There are a number of non-yellowing commercially available UV initiators. Examples include but are not limited to Irgacure 184 (1-hydroxycyclohexyl phenyl ketone), and Darocur 2959 or 1173 sold by Ciba Geigy Corporation, and KIP 100F (2-hydroxyalkyl phenone) sold by Fratelli Lamberti Esacure. KIP 100F and Darocur 2959 and 1173 are liquids, that are readily miscible with the other components of the polymerizable composition. Irgacure 184 is a white powder with extremely good absorbance and non-yellowing properties.

Other UV and thermal initiators include benzophenone, trimethylbenzophenone, isopropylthioxanthone, and ethyl 4-(dimethylamino)benzoate, benzoyl peroxide, acetyl peroxide, lauryl peroxide, azobisisobutyronitrile, t-butyl peracetate, cumyl peroxide, t-butyl peroxide, t-butyl hydroperoxide, bis(isopropyl)peroxydicarbonate, benzoin methyl ether, 2,2'-azobis(2,4-dimethylvaleronitrile), tertiarybutyl peroctoate, phthalic peroxide, diethoxyacetophenone, and tertiarybutyl peroxypivalate, diethoxyacetophenone, 1-hydroxycyclohexyl phenyl ketone, 2,2-dimethoxy-2-phenyl-acetophenone, phenothiazine, and diisopropylxanthogen disulfide.

IV. Inhibitors

Inhibitors are optionally added to the polymerizable composition to inhibit polymerization under normal storage conditions, by acting as radical scavengers. Any inhibitor known to those skilled in the art can be used in any effective concentration. The most common inhibitors are hydroquinone (HQ) and hydroquinone monomethylether (MEHQ). HQ has been found to increase yellowing at high concentrations while MEHQ does not. Inhibitor levels should be minimized since they retard the speed of the initiation and propagation process during polymerization. Typical concentrations in the final formulations are optimally between 0.002 to 0.2 weight percent.

V. UV Stabilizers

Stabilizers can be used to prevent changes in lens properties with time. These include UV absorbers (UVA), hindered light amine stabilizers (HALS) and antioxidants (AO). UVAs preferentially absorb incident UV radiation, thereby preventing the radiation from reaching the casted polymer. Examples include Tinuvin 328, Tinuvin 900, and Tinuvin 1130 from Ciba Geigy. HALS do not function by absorbing UV radiation, but inhibit degradation of the casted polymer by binding with free radicals. Examples include Tinuvin 292, and Tinuvin 144 from Ciba Geigy. AOs also terminate free radicals, particularly those associated with peroxy radicals. They are not generally used as light stabilizers. Examples include Irganox 1010 and Irganox 1076 from Ciba Geigy.

The lens material can also be protected from UV radiation after casting, by applying an anti-UV coating or by dipping the lens in a suitable solution.

VI. Other Additives

Internal mold releases can be added to the polymerizable composition to improve releasability from the molds, but are not required, and if possible, should be avoided as they can reduce clarity. Examples of release agents include butyl stearate, dioctylphthalate, Zelec UN and Zelec NE sold by E.I. DuPont NeMours and Company. Other additives, such as dyes and wetting agents, can also be included.

VII. Process of Polymerization

The problems of shrinkage and lengthy cure time associated with the traditional casting process for ophthalmic lenses are solved by casting the polymerizable composition disclosed herein using the sequential polymerization technique taught in U.S. Pat. Nos. 5,110,514, and 5,114,632 to Soane. The sequential polymerization method minimizes stress and cavitation, or voids caused by the shrinkage of material during polymerization, that would otherwise cause material stress and decreased mold replication reliability. Using sequential polymerization, mold design is straightforward. The costly experimentation required to engineer a mold that accounts for resin shrinkage is avoided. The sequential process is easily adapted to either radiation or thermal curing. Radiation curing is preferred because it is more convenient and in general requires a shorter cure time. Radiation curing can be performed at moderately elevated temperature to further reduce polymerization time.

The apparatus for the production of a lens from a polymerizable composition preferably includes a carriage frame; a concave (or convex) mold that allows the transmission of energy that is capable of initiating polymerization attached to the carriage frame; a moving stage that can be driven across the carriage frame; a means for moving the stage across the carriage frame; a convex (or concave) mold, wherein the convex (or concave) mold is attached to the moving stage, and wherein the convex (or concave) mold can be moved adjacent to the transparent concave (or convex) mold to define an internal cavity there between, the cavity corresponding to the precise dimensions of the lens; a means for introducing polymerizable composition into the internal cavity; a source of energy for transmission through the concave (convex) mold in a sequential manner; and a means for sequentially exposing the polymerizable material to the energy source beginning at a point opposite to that wherein the polymerizable composition is introduced, and proceeding to the point wherein the polymerizable composition is introduced.

Figure 1:
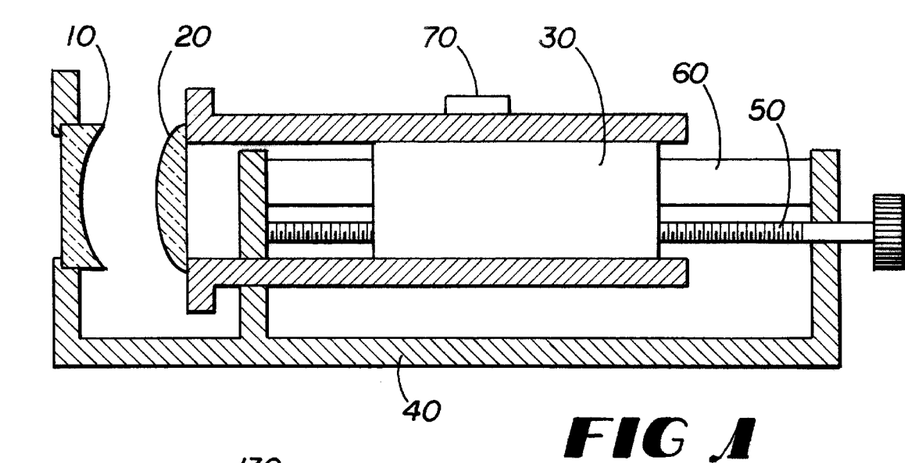
FIG. 1 is a schematic side cross sectional view of a first embodiment of a carriage system for use in the sequential polymerization of a polymerizable composition into an ophthalmic lens.
Figure 2:
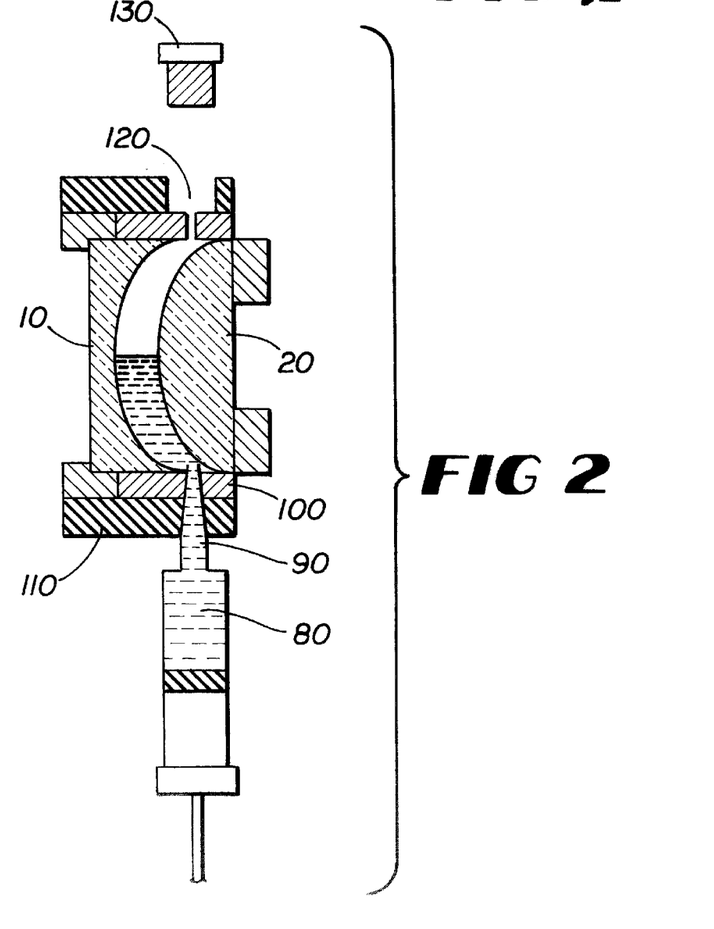
FIG. 2 is a schematic side cross sectional view of a portion of the carriage system embodiment of FIG. 1, illustrating the procedure for syringe filling of the lens mold.
Figure 3:
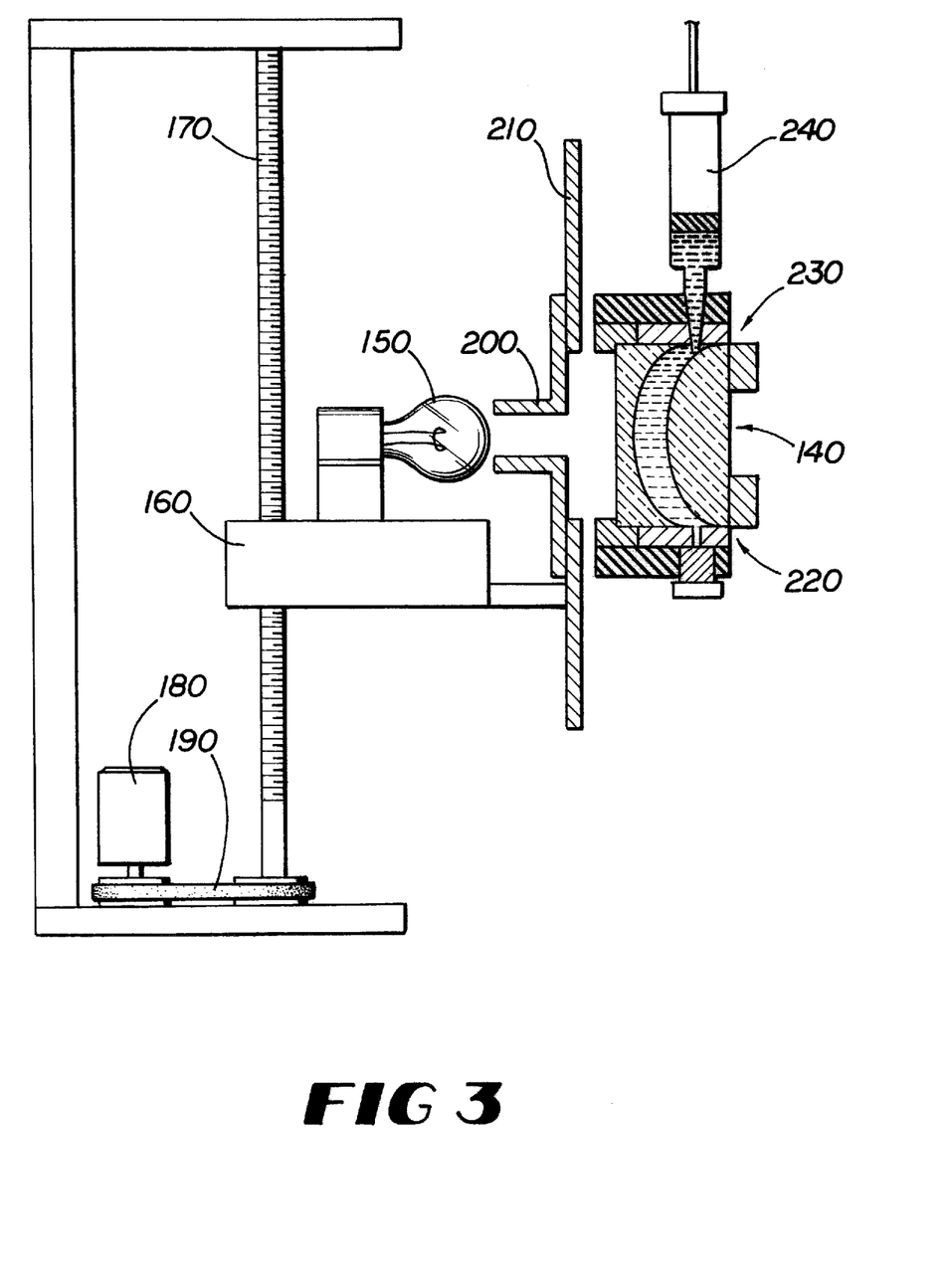
FIG. 3 is a schematic side cross sectional view of another portion of the carriage system embodiment of FIG. 1, with lens mold rotated 180 degrees, positioned in front of a movable UV source.

One embodiment of a method and apparatus for the preparation of a lens by sequential polymerization is illustrated in FIGS. 1 to 3. FIG. 1 illustrates a carriage system that holds a concave (10) mold that forms the convex surface of the finished lens and a convex (20) mold that forms the concave surface of the finished lens. In a preferred embodiment, the convex mold (20) is attached to a moving stage (30) while the concave mold (10) is snapped into a holder that is part of the carriage frame (40). Experiments have shown that the abrasion resistance of the face closer to the lamp source (i.e., the front mold) can be greater than the face away from it. Since most ophthalmic retail outlets have the capability of coating the concave surface of the lens, this embodiment is preferred. The opposite arrangement (i.e., convex mold attached to the stage, with the concave mold attached to the holder) is also possible. The mold attached to the holder should be made of a material that is UV transparent, such as BK-7 glass. This mold (10), attached to the carriage frame, can be enclosed by an outer ring that serves as a goniometer indicating the degree of rotation about an axis. This feature is necessary for non-spherical molds. Rotation is required with respect to the mold attached to the stage (20) to dial in the desired cylinder orientation particularly when aspheric, multi-focal, or progressive lenses are being fabricated.

A lead screw (50) drives the stage (30) forward and backward along a guide rod (60). A distance indicator (70) informs the user of the location of the stage.

The carriage forms a cavity between the two molds (10,20) that is filled with the fluid polymerizable composition. FIG. 2 is a schematic side cross sectional view of a portion of the carriage system embodiment of FIG. 1, illustrating the procedure for syringe filling of the lens mold. The fluid is contained in a disposable syringe (80) fitted with a tapered tip (90). A larger volume reservoir or other receptacle can be used instead of a syringe, as desired. Before the molds are brought together, a flexible gasket (100) made of an inert material such as flexible PVC, silicone, or rubber, is fitted around mold (10). A rigid clamp (110) is then attached around the gasket to provide support. The stage (30) is then positioned such that the molds are separated by a desired distance. A brake or locking system is then employed so that even under high pressure (between 30 and 50 psi), the stage is fixed in its locked position. Any suitable locking system, such as a back stop or even a brake, can be used.

In a preferred embodiment, the inside of the cavity other than the UV transparent mold (10) is black or lined with an anti-reflective coating to prevent light scattering.

The fluid polymerizable composition is introduced into the cavity by pushing the syringe tip through a small hole in the bottom of the gasket. Fluid is introduced from the bottom of the cavity to allow bubble free filling. Fluid can be driven into the cavity mechanically or by gas pressure. If gas is used, and is in contact with the fluid, it is preferred that the gas be inert, (for example nitrogen or helium), to minimize dissolved oxygen in the composition. An air vent (120) at the top of the gasket allows air to escape as the cavity is filled. After the cavity is filled, a cap (130) is positioned to plug the air vent.

After the cavity is filled with the polymerizable composition, the carriage (140) is rotated in such a manner that the syringe is positioned at the top of the carriage. A known positive pressure or force, typically between 20 and 50 psi, is applied to the syringe during the polymerization step. The optimal pressure is dictated by the flow arrangement, system viscosity, and cure rate.

The carriage is transferred to a curing station for sequential polymerization. FIG. 3 is a schematic side cross sectional view of another portion of the carriage system embodiment of FIG. 1, with lens mold rotated 180 degrees, positioned in front of a movable UV source. The curing station consists of a long wave UV light source (250 to 400 nm) (150), that preferably emits collimated light that is attached to a moving stage (160). The stage is driven by a lead screw (170) attached to a motor (180) and drive system (190). The motor is preferably connected to a control system, such as a computer, that sets and varies scan rates as desired. A slit (200) of adjustable verticle opening of between 0.25 and 2.0 inches, attached to a frame (210) provides a plane band of UV light. The frame is attached to the moving stage (160) to allow the light source and slit to move as a single unit. During sequential polymerization, movement of the light source/slit assembly relative to the carriage assembly is controlled such that the plane band of UV light scans across the carriage starting at the bottom of the cavity (220) and moving toward the top (230). The opposite arrangement, wherein the carriage moves relative to a fixed light source and slit assembly, is also possible.

The fluid polymerizable composition, that is contained in the syringe (240), is constantly resupplied to the cavity. Thus, as polymerization occurs below the reservoir, the shrinkage that occurs is immediately replenished by additional polymerizable composition. The polymerizable composition is highly mobile and flows readily to fill the volume lost during shrinkage of the part of the mixture that has already polymerized. The nearly instantaneous replacement of the space formed by shrinkage with unreacted fluid ensures a final object that is virtually defect free and distortionless.

In an optional embodiment, after sequential polymerization is completed, a post cure step can be carried out wherein the entire mold cavity is exposed to blanket UV radiation. To ensure that defects do not appear, post curing should be carried out only when the entire lens is at a sufficiently advanced stage of cure that shrinkage is minimal. Post curing is preferably performed while the article is still in the mold to prevent oxygen inhibition of the curing process. At the completion of the curing process, the mold structure can be taken apart and the precision cast part removed.

The equipment described above can be used to produce spherical, progressive and aspheric lenses. The final lenses can optionally be tinted with dye or anti-UV agents after the polymerization process is complete.

Finished spherical lenses of 74 mm diameter with a −2.0 diopter power were prepared using a variety of embodiments of the polymerizable composition described herein, using the sequential polymerization method illustrated in FIGS. 1 to 3. The initiator and other additives were added to the diluent and stirred vigorously. This mixture was then added to the oligomers and the sample heated to approximately 50 degrees C carefully in a water bath, and stirred vigorously for between two and three hours (stirring can range from thirty minutes to three hours), taking care to ensure that the oligomer is completely incorporated in the solution. The resulting polymerizable fluid was poured into a syringe and introduced between two glass molds that were separated with a center distance of 2 mm (see FIG. 2). The glass molds were constructed of BK-7 glass that transmits long wave UV radiation. The molds were coated with an external release agent. The fluid was retained between the molds using a flexible PVC gasket and clamp assembly. Pressure of between 25 and 35 psi was maintained on the fluid during the entire curing process. The composition was sequentially polymerized using mercury vapor lamps of between 160 and 250 W and a horizontal slit assembly as described above and in U.S. Pat. No. 5,114,632. The slit opening was varied from 0.5 to 1.0 inches. Sequential polymerization time varied from 15 to 27 minutes. Initiator concentration was varied from 0.2 to 0.5 weight percent.

EXAMPLE 1

A mixture of 50 percent by weight Radcure 284 urethane diacrylate, 20 percent by weight Radcure 8301 urethane hexaacrylate, 29.6 percent by weight ethoxylated trimethylolpropane triacrylate, and 0.4 percent by weight KIP 100F initiator was prepared and cast as described above, using a ¾ inch slit size. The sample was sequentially irradiated for 22 minutes.

EXAMPLE 2

A mixture of 75 percent by weight Radcure 284 urethane diacrylate, 24.6 percent by weight hexane diol diacrylate, and 0.4 percent by weight Darocur 1173 initiator was prepared, as cast as described above. A ¾ inch slit size was used with an irradiation time of 22 minutes.

EXAMPLE 3

A mixture of 75 percent by weight Sartomer 963E75 urethane diacrylate, 24.6 percent by weight pentaerthritol triacrylate, and 0.3 percent by weight Irgacure 184 initiator was prepared, and cast as described above. A one inch slit size was used with an irradiation time of 18 minutes.

EXAMPLE 4

A mixture of 37.5 percent by weight Radcure 264 urethane triacrylate, 37.5 percent by weight Sartomer 963E75 urethane diacrylate, 24.7 percent by weight hexane diol, and 0.3 percent by weight Darocure 1173 initiator was prepared, and cast as described above. A one inch slit size was used with a run time of 18 minutes.

EXAMPLE 5

A mixture of 40 percent by weight Radcure 284 urethane diacrylate, 40 percent by weight Radcure 264 urethane triacrylate, 19.7 percent by weight trimethylol propane triacrylate, and 0.3 percent by weight Irgacure 184 initiator was prepared, and cast as described above. A one inch slit size was used with an irradiation time of 18 minutes.

EXAMPLE 6

A mixture of 37.5 percent by weight Radcure 284 urethane diacrylate, 37.5 percent by weight Radcure 264 urethane triacrylate, 24.7 percent by weight ethoxylated trimethyolpropane triacrylate, and 0.3 percent by weight Darocure 1173 initiator was prepared, and cast as described above. A one inch slit was used with an irradiation time of 18 minutes.

EXAMPLE 7

A mixture of 43 percent by weight Radcure 284 urethane diacrylate, 37 percent by weight Radcure 264 urethane triacrylate, 10 percent by weight ethoxylated trimethyolpropane triacrylate, 9.7 percent by weight trimethyolpropane triacrylate, and 0.3 percent by weight KIP 100F initiator was prepared, and cast as described. A one inch slit was used with an irradiation time of 18 minutes.

EXAMPLE 8

A mixture of 40 percent by weight Radcure 284 urethane diacrylate, 40 percent by weight Radcure 264 urethane triacrylate, 19.8 percent by weight ethoxylated pentaerythritol tetraacrylate, and 0.2 percent by weight Irgacure 184 initiator was prepared, and cast as described above. A 0.75 inch slit size was used with an irradiation time of 15 minutes.

EXAMPLE 9

A mixture of 37 percent by weight Radcure 284 urethane diacrylate, 33 percent by weight Radcure 264 urethane triacrylate, 29.8 percent by weight ethoxylated pentaerythritol teraacrylate, and 0.2 percent by weight Irgacure 184 initiator was prepared, and cast as described above. A 0.75 inch slit size was used with an irradiation time of 15 minutes.

EXAMPLE 10

A mixture of 60 percent by weight Radcure 284 urethane diacrylate, 10 percent by weight polyester acrylate, 29.6 percent by weight ethoxylated timethyolpropane triacrylate, and 0.4 percent by weight Irgacure 184 initiator was prepared, and cast as described above. A 0.75 slit size was used with an irradiation time of 18 minutes.

EXAMPLE 11

The lenses prepared in Examples 1–10 were evaluated for impact and abrasion resistance. A Nikon lensometer was used to evaluate the optical power of the lenses. The optical powers of all of the lenses were within ⅛ diopta of the specified power (−2.0 diopta) and no cylinder was found throughout the lens.

The lenses were subjected to abrasion testing using the Bayer test (ASTM F-735), which is based on a haze reading of an abraded lens. The results of the abrasion test are presented in Table 1, which indicates the difference in abrasion resistance between the test lens and CR-39.

Impact resistance was evaluated using the FDA drop ball test. FDA regulations require that lenses not crack when impacted with a ⅝" stainless steel ball dropped from a height of 50 inches. All of the lenses prepared as described herein easily pass this test. The lenses were also tested by dropping progressively heavier balls from the 50 inch height until the lens cracked. Table 1 indicates the relative increase in ball weight over the ⅝" FDA ball required to crack the lens. The greatest weight used was 8 times heavier than the ⅝" ball. Some formulations did not crack even under this weight.

TABLE 1

| | Oligomer | | Diluent | | Abrasion | Impact Test |
|---|---|---|---|---|---|---|
| Ex # | Name | wt % | Name | wt % | (x CR39) | (x FDA) |
| 1 | 8301 | 20 | ETMPTA | 30 | 0.9 | 5.8 |
|   | 284  | 50 |        |    |     |     |
| 2 | 284  | 75 | ETMPTA | 25 | 1.3 | >8  |
| 3 | 963E75 | 75 | PETA | 25 | 0.8 | 3.4 |
| 4 | 264  | 37 | HD     | 25 | 1.2 | 4.1 |
|   | 963E75 | 37 |      |    |     |     |
| 5 | 284  | 40 | TMPTA  | 20 | 1.4 | 5.8 |
|   | 264  | 40 |        |    |     |     |
| 6 | 284  | 37 | ETMPTA | 25 | 1.8 | >8  |
|   | 264  | 37 |        |    |     |     |
| 7 | 284  | 43 | TMPTA  | 10 | 1.5 | 6.9 |
|   | 264  | 37 | ETMPTA | 10 |     |     |
| 8 | 284  | 40 | EPETA  | 20 | 1.9 | >8  |
|   | 264  | 40 |        |    |     |     |
| 9 | 284  | 37 | EPETA  | 30 | 1.6 | >8  |
|   | 264  | 33 |        |    |     |     |
| 10 | 284 | 60 | ETMPTA | 30 | —   | >8  |
|   | 770  | 10 |        |    |     |     |

8301 — Radcure Urethane hexaacrylate
284 — Radcure Urethane diacrylate diluted with HD
264 — Radcure Urethane triacrylate diluted with HD
963-E75 — Sartomer Urethane diacrylate diluted with ETMPTA
770 — Radcure polyester acrylate oligomer diluted with hydroxyethyl-methacrylate
TMPTA — trimethylol propane triacrylate
ETMPTA — ethoxylated trimethylol propane triacrylate
PETA — pentaerythritol triacrylate
EPETA — ethoxylated pentaerythritol tetraacrylate
HD — 1,6 hexane diol diacrylate This invention has been described with reference to its preferred embodiments. Variations and modifications of theinvention described herein will be obvious to those skilled in the art from the foregoing detailed description of the invention. It is intended that all of these variations and modifications be included within the scope of the appended claims.

We claim:

1. A free radical polymerizable composition for the production of opthalmic lenses, comprising:
   a) between 20 and 90 percent of epoxy oligomers, end terminated with acrylate or methacrylate, or mixtures of acrylate and methacrylate, and wherein the epoxy oligomer is prepared by reacting an epoxide with acrylic acid, methacrylic acid, or a mixture thereof, to form an esterified acrylate or methacrylate; and
   b) between 5 and 80 weight percent of a diluent that comprises both:
      (i) a hydrocarbon diol of the formula $H_2C=CRC(O)O(X)OC(O)CR=CH_2$, wherein R is independently H or methyl, and X is a straight or branched alkane of $C_2$ to $C_{14}$; and
      (ii) an ethoxylated or propoxylated tri, tetra, or polyacrylate or methacrylate, or mixtures thereof.

2. A free radical polymerizable composition for the production of ophthalmic lenses; comprising:
   a) between 2 and 90 percent by weight of a mixture of urethane and epoxy oligomers end terminated with acrylate or methacrylate; and wherein the epoxy oligomer is prepared by reacting an epoxide with acrylic acid, methacrylic acid, or a mixture thereof, to form an esterified acrylate or methacrylate; and
   b) between 5 and 80 weight percent of a diluent that comprises both:
      (i) a hydro carbon diol of the formula $H_2C=CRC(O)O(X)OC(O)CR=CH_2$, wherein R is independently H or methyl, and X is a straight or branded alkane of $C_2$ to $C_{14}$; and
      (ii) an ethoxylated or propoxylated tri, tetra, or polyacrylate or methacrylate, or mixtures thereof.

3. A free radical polymerizable composition, comprising:
   a) between 50 and 75 weight percent of urethane oligomers, end terminated with acrylate or methacrylate, or mixtures of acrylate and methacrylate; and
   b) between 5 and 80 weight percent of a diluent that comprises both:

(i) a hydrocarbon diol of the formula $H_2C=CRC(O)OXOC(O)CR=CH_2$, wherein R is independently H or methyl, and X is a straight or branched alkane of $C_2$ to $C_{14}$; and (ii) an ethoxylated or propoxylated tri, tetra, or polyacrylate or methacrylate, or mixtures thereof.

4. A free radical polymerizable composition, comprising:

a) between 20 and 90 weight percent of urethane oligomers, end terminated with acrylate or methacrylate, or mixtures of acrylate and methacrylate; and b) between 5 and 80 weight percent of a diluent that comprises a mixture of 1,6-hexane diol diacrylate and ethoxylated pentaerythritol tri- or tetra-acrylate.

5. A free radical polymerizable composition, comprising:

a) between 20 and 90 weight percent of urethane oligomers, end terminated with acrylate or methacrylate, or mixtures of acrylate and methacrylate; and b) between 5 and 80 weight percent of a diluent that comprises a mixture of 1,6-hexane diol diacrylate and ethoxylated trimethylolpropane triacrylate.

6. The composition of claim 1, wherein the epoxy oligomer contains between 2 and 6 acrylate or methacrylate groups.

7. The composition of claim 1, wherein the diluent is present in the composition in an amount between 10 and 40 percent by weight.

8. The composition of claim 2, wherein the diluent is present in the composition in an amount between 10 and 40 percent by weight.

9. The composition of claim 3, wherein the diluent is present in the composition in an amount between 10 and 40 percent by weight.

10. The composition of claim 1, wherein the oligomer comprises between 50 and 75 percent by weight of the composition.

11. The composition of claim 2, wherein the oligomer comprises between 50 and 75 percent by weight of the composition.

12. The composition of claim 3, wherein the diluent is a mixture of 1,6-hexane diol diacrylate and ethoxylated pentaerythritol tri- or tetra-acrylate.

13. The composition of claim 2, wherein the diluent is a mixture of 1,6-hexane diol diacrylate and ethoxylated pentaerythritol tri- or tetra-acrylate.

14. The composition of claim 3, wherein the diluent is a mixture of 1,6-hexane diol diacrylate and ethoxylated pentaerythritol tri- or tetra-acrylate.

15. The composition of claim 1, wherein the diluent is a mixture of 1,6-hexane diol diacrylate and ethoxylated trimethylol propane triacrylate.

16. The composition of claim 2, wherein the diluent is a mixture of 1,6-hexane diol diacrylate and ethoxylated trimethylol propane triacrylate.

17. The composition of claim 3, wherein the diluent is a mixture of 1,6-hexane diol diacrylate and ethoxylated trimethylol propane triacrylate.

18. A lens prepared from a free radical polymerizable composition, comprising:

a) between 50 and 75 weight percent of urethane oligomers, end terminated with acrylate or methacrylate, or mixtures of acrylate and methacrylate; and b) between 5 and 80 weight percent of a diluent that comprises both:

(i) a hydrocarbon diol of the formula $H_2C=CRC(O)OXOC(O)CR=CH_2$, wherein R is independently H or methyl, and X is a straight or branched alkane of $C_2$ to $C_{14}$; and (ii) an ethoxylated or propoxylated tri, tetra, or polyacrylate or methacrylate, or mixtures thereof.

* * * * *